May 20, 1930.  J. MYERS  1,758,964
PARKING DEVICE FOR MOTOR VEHICLES
Filed May 16, 1927  3 Sheets-Sheet 2
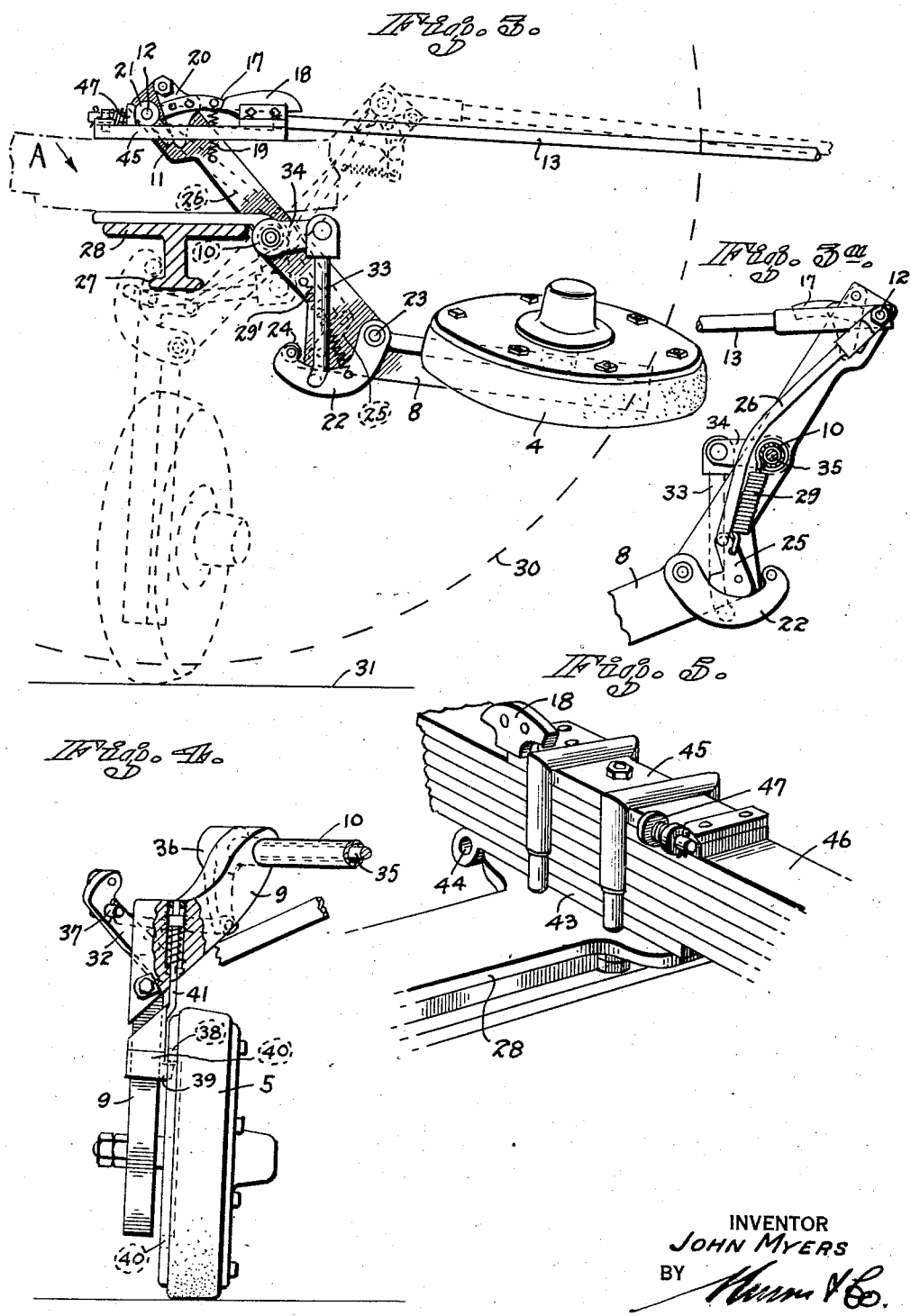
INVENTOR
JOHN MYERS
BY
ATTORNEYS.

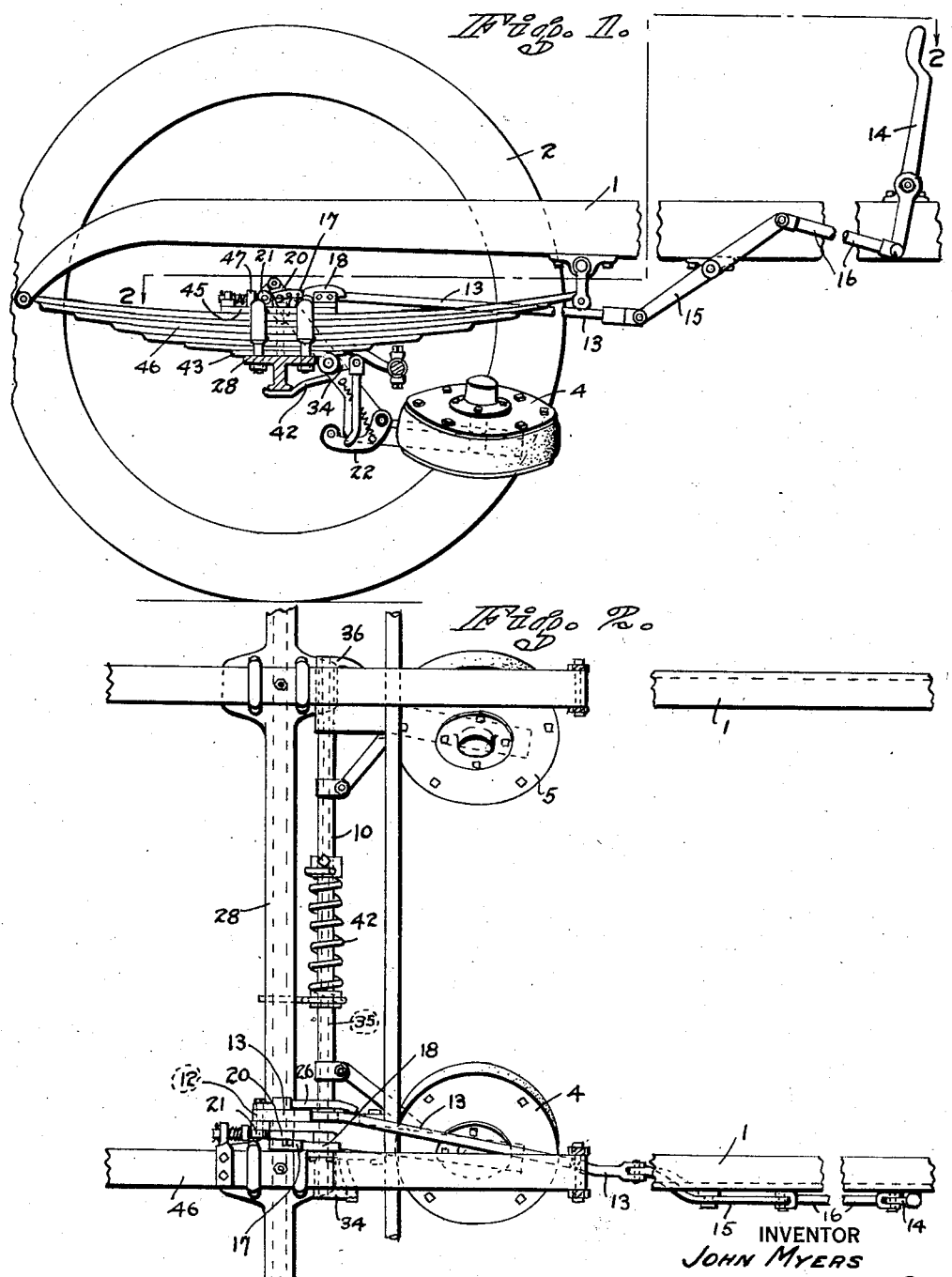

May 20, 1930.　　　　　J. MYERS　　　　　1,758,964
PARKING DEVICE FOR MOTOR VEHICLES
Filed May 16, 1927　　　3 Sheets-Sheet 3
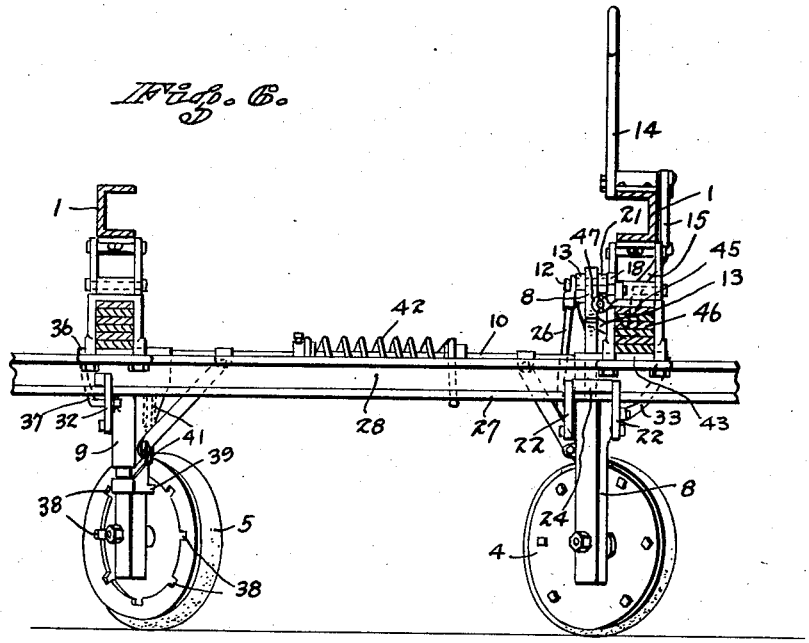

Patented May 20, 1930

1,758,964

UNITED STATES PATENT OFFICE

JOHN MYERS, OF OROVILLE, CALIFORNIA

PARKING DEVICE FOR MOTOR VEHICLES

Application filed May 16, 1927. Serial No. 191,816.

My invention relates to improvements in parking devices for motor vehicles, and it consists in the combinations, constructions and arrangements hereinafter described and claimed.

An object of my invention is to provide a parking device for motor vehicles which is adapted to lift the front wheels of the vehicle off from the ground and then to swing the front of the vehicle about the rear end thereof as a pivot until the vehicle parallels a curbing, or the like.

A further object of my invention is to provide a device of the type described which is simple in construction, and which may be readily attached to a standard automobile with but slight alterations being necessary in the latter.

A further object of my invention is to provide a device of the type described which makes use of a single lever for actuating the entire device, the device when actuated being movable into operative or inoperative position, for locking the device in either of these two positions and for automatically releasing a braking force from one of the supporting wheels when the device is in operative position.

Other objects and advantages will appear in the following specification, and the novel features of my invention will be particularly pointed out in the appended claims.

My invention is illustrated in the accompanying drawings, forming a part of this application, in which Figure 1 is a side elevation of the device as shown operatively applied to a vehicle;

Figure 2 is a plan view of Figure 1;

Figure 3 is an enlarged detail view showing one of the supporting wheels in operative and inoperative position;

Figure 3a is a view of a portion of the actuating mechanism;

Figure 4 is a view illustrating the mechanism associated with the other supporting wheel which cooperates with the wheel shown in Figure 3;

Figure 5 is a perspective view of a portion of the spring and axle of an automobile illustrating how the parts for supporting the mechanism are secured in place;

Figure 6 is a front elevation of Figure 1 showing the supporting wheels in operative position; and Figure 7 is a diagrammatic showing of a vehicle with my device attached thereto.

In carrying out my invention I make use of a vehicle 1, see Figure 7, which includes the usual front wheels 2 and rear wheels 3. In many instances the parking space left open to a vehicle is just large enough to receive the vehicle and it is therefore impossible to back into the space, because the front wheels 2 cannot be turned to the desired angle. It is the purpose of the present invention to provide means for lifting the front wheels 2, and for temporarily supporting the front of the vehicle upon traction wheels 4 and 5, these wheels being inclined at such an angle that their axes will intersect the axis of the rear axle 6 at a point 7, see Figure 7. It will be seen that the front of the vehicle may now be swung towards the curb by merely backing the car and that the car will swing about the point 7 as a pivot.

The means for moving the traction wheels 4 and 5 into operative and inoperative position will now be described. The wheels 4 and 5 are carried by arms 8 and 9 and these arms are secured to a hollow cross shaft 10, see Figure 2. I will first describe the mechanism for moving the wheel 4 and then will set forth the mechanism for moving wheel 5. Of course, both wheels will be moved simultaneously by the common connecting shaft 10.

The arm 8 projects above the hollow shaft 10, see Figure 3, and is provided with a slot 11 in its upper end in which a pin 12 is slidably disposed. The pin as shown in Figure 3a is connected to a link 13 and Figure 1 shows how the link 13 is connected to an actuating lever 14 by means of a lever 15 and a link 16.

The arm 8 is normally locked in the position shown in Figure 3 by a spring actuated catch 17, this catch bearing against a stop member 18 and being held in this position by a spring 19. The catch 17 is carried by a cam 20, and is moved free of the stop 18 when the lever 14, see Figure 1, is swung rearwardly.

The rearward movement of the lever 14 will cause the link 13 to be moved in the direction of the arrow A, in Figure 3. This movement causes the pin 12 to slide down in the slot 11 without imparting any movement to the arm 8. The movement of the pin 12 in the slot, however, causes a roller 21 carried by the pin, to contact with the cam 20 and to swing the catch 17 free of the stop 18. It will now be seen that the catch will ride over the stop and will permit the arm 8 to be swung into the dotted line position shown in Figure 3 at a slight angle forward with respect to a perpendicular to the frame of the vehicle. During the movement of the arm 8 into the dotted line position, the pin 12 will travel to the end of the slot 11 and then back to the same end it formerly occupied, although during this movement the arm will be swung through an arc of 90 degrees.

I provide means for locking the arm 8 in the dotted line position and this means is shown in Figures 3 and 3ª. A pair of arms 22, see also Figure 6, are pivotally secured at 23 to the arm 8 and carry a roller 24 at their free ends. One of the arms 22 is adapted to be moved by a cam 25, see Figure 3ª, and this cam in turn is actuated by a link 26 which connects the cam with the pin 12. The arrangement is such that the movement of the arm 8 from the full to the dotted line position shown in Figure 3 will cause the pin 12 to move in the slot 11 and to swing the arms 22 so that the roller 24 will clear the lower lip 27 of the front axle 28, see Figure 3, until the arm 8 is in operative position, whereupon the cam 25 will release the arms 22 and a spring 29' will cause the arms 22 to lock the arm 8 to the front axle 28. A spring 29, see Figure 3ª, is used for moving the cam 25 back into inoperative position.

Figure 3 clearly shows how the wheel 4 when swung into the dotted line position shown, will lift the front wheel, indicated by the dotted line 30, clear off the ground 31, and thus permit the wheel 4 to move the front of the car laterally, as set forth in the first part of the specification.

I will now describe the mechanism associated with the wheel 5. As hereinbefore stated, the arms 8 and 9 are rigidly connected to each other by the shaft 10 and therefore a movement of the arm 8 into operative position will likewise move the arm 9 into operative position. The arm 9 is provided with a locking arm 32 similar to the arms 22 and the arm 32 is connected to the arms 22 by a link 33, see Figure 3, an arm 34 carried by a shaft 35 mounted within the shaft 10, see Figure 4, an arm 36 on a link 37. It will be seen from this construction that the movement of the arms 22 will cause a like movement of the arm 32 and that the arm 32 will engage with the front axle 28 in the same manner as the arms 22.

I found that the wheels 4 and 5 will tend to rotate as the car is lifted and that this rotation will prevent the wheels 4 and 5 from being swung into operative position. I have therefore devised a braking mechanism for the wheel 5 that will prevent the rotation thereof until the wheel is in operative position, as shown in Figure 4. Reference may be had to Figure 6 and it will be noted from this figure that the wheel 5 has a plurality of notches 38 therein for receiving a catch 39 of a member 40 which is slidably disposed upon the arm 9. Figure 4 shows how the member 40 is carried by a spring pressed plunger 41 which normally holds the catch 39 in one of the notches 38 and thus prevents rotation of the wheel 5. The wheel 5 is locked against rotation until the arm 9 is swung into operative position. At this juncture the top of the plunger 41 will contact with the front axle 28, see Figure 6 and will move the catch 39 out of engagement with its notch 38, thus permitting the wheel 5 to rotate. When the lug 39 happens to fall between two of the notches 38, the application of power to the vehicle will cause the wheel to rotate until one of the notches is brought into alignment with the lug, at which time the pressure of the spring on plunger 41 carrying lug 39 causes it to engage with the notch. This locks the wheel against further rotation until the front end of the vehicle, by further application of power, has been lifted and is carried by arms 8 and 9. The latch is now automatically disengaged and the wheel 5 again free to rotate. The notches being relatively close, the sidewise movement of the vehicle is only a matter of inches before one of them is brought into alignment with the lug.

The wheels 4 and 5 are swung into inoperative position by a coil spring 42, see Figure 2, which is disposed around the shaft 10 and is connected thereto and to the front axle 28 in the desired manner.

From the foregoing description of the device, the operation thereof will be readily understood.

In Figure 5 I show how the supporting member 43 is secured in place and is provided with a bearing 44 for receiving the shaft 10. There are two such supporting members 43 employed with each car 1 for supporting each end of the shaft 10. A second supporting member 45 is disposed on top of the spring 46 and carries the stop member 18 and a bumper 47.

Assume that the driver of the car wishes to park in a limited space: he jockies the car until the car is approximately in the position shown in Figure 7 with respect to the curbing 48. He now moves the lever 14 rearwardly and at the same time throws the car into reverse, which causes the front of the car to be supported by the wheels 4 and 5. The novel braking mechanism for the wheel 5 already described permits the car to be rocked up upon the wheels 4 and 5 and then the wheel 5 is released automatically so that it is free to rotate for carrying the front of the car toward the curbing 48. During the movement of the lever 14 rearwardly, the catch 17 will be automatically released and the locking arms 22 and 32 will be moved so as to clear the lip 27 and then to engage with the axle for holding the arms 8 and 9 in operative position. If there is a crown in the road, the front of the car will very likely swing toward the curbing 48, due to gravity. However, if the road is flat, the car may be reversed and the turning of the rear wheels 3 will cause the front of the car to swing about the pivot 7.

In swinging the wheels 4 and 5 into inoperative position, the lever 14 is swung forwardly and will swing the arms 8 and 9 into the positions shown in Figure 2. The spring 42 will aid the swinging of the arms in this direction. The lever 14 when swung forwardly will cause the pin 12 to slide in the slot 11 and to release the arms 22 and 32 from the front axle 28. The spring 42 will swing the arm 8 into the full line position shown in Figure 3, thus permitting the spring 19 to move the catch 17 into locked position with respect to the stop 18. The roller 21 abuts against the bumper 47 when the device is in inoperative position.

Although I have shown and described one embodiment of my invention, it is to be understood that the same is susceptible of various changes and I reserve the right to employ such changes as may come within the scope of the appended claims.

I claim:

1. The combination with a vehicle having a front axle and front wheels, of traction wheels for lifting the front wheels clear of the ground, manually controlled means for moving said wheels into contact with the ground, said wheels lifting the front wheels when the back wheels of the automobile rotate forwardly, and automatic means for locking said traction wheels in either of these two positions.

2. In a device of the type described, a traction wheel, means for moving said wheel into operative position, braking means, and automatic means for releasing the braking force from said wheel when said wheel is in operative position.

3. In a device of the type described, a shaft, a pair of traction wheel carrying arms connected to said shaft, means for moving said arms into operative position, means for locking said arms in this position and spring means for freely moving said arms into inoperative position when said arms have been initially freed from said locking means.

4. In a device of the type described, a shaft, a pair of traction wheel carrying arms connected to said shaft, means for moving said arms into operative position and spring means for moving said arms into inoperative position, and automatic means for locking said arms in operative and inoperative position, said spring means freely moving said arms when said arms have been initially freed from said locking means.

5. A device of the type described comprising a tracting wheel carrying arm, manually controlled means for moving said arm, means for locking said arm in inoperative position, said locking means being automatically moved into inoperative position during the initial movement of the arm moving means.

6. A device of the type described comprising a traction wheel carrying arm, manually controlled means for moving said arm, means for locking said arm in inoperative position, said locking means being moved into inoperative position during the initial movement of the arm moving means, means for locking said arm to the front axle of a vehicle, said last named locking means being temporarily moved into inoperative position by the arm moving means for permitting said locking means to engage with the front axle.

7. In a device of the type described, a hollow shaft, traction wheel carrying arms secured to said hollow shaft, means carried by each arm for locking said arms to the front axle of a vehicle and means mounted in said shaft for connecting the locking means of each arm together.

8. The combination with a vehicle having front and rear wheels, of traction wheels, means for swinging said traction wheels into operative position for lifting the front of the vehicle, the plane of said wheels extending transversely of the vehicle, and braking means for one of said traction wheels for preventing rotation thereof until said wheels are in operative position.

9. The combination with a vehicle having front and rear wheels, of traction wheels, means for swinging said traction wheels into operative position for lifting the front of the vehicle, the plane of said wheels extending transversely of the vehicle, braking means for one of said traction wheels for preventing rotation thereof until said wheels are in operative position and automatic means for releasing said braking means when said wheels are swung into operative position.

10. The combination with a vehicle, of traction wheel-carrying arms, means for swinging said arms into operative position for lifting the front of the vehicle, a member slidably disposed on one of said arms, yielding means for urging said member into contact with one of said wheels for preventing rotation thereof, and automatic means for releasing said member when said wheels are swung into operative position.

11. The combination with a vehicle having front and rear wheels, of traction wheel-carrying arms disposed adjacent to said front wheels, means for swinging said arms into operative position for raising the front of the vehicle, the axes of said traction wheels intersecting each other at a point to one side of the vehicle whereby a rotation of the rear wheels will swing the front part of the vehicle about the intersecting point of said axes as a pivot.

12. The combination with a vehicle having front and rear wheels, of traction wheel-carrying arms, means for swinging said arms into operative position for raising the front of the vehicle, the axes of said wheels intersecting each other at a point to one side of the vehicle and on the extended axes of said rear wheels whereby a rotation of the rear wheels will swing the front part of the vehicle about the intersecting point of said axes as a pivot.

13. The combination with a vehicle having a front axle, of traction wheel-carrying arms disposed to the rear of said axle, means for swinging said arms for lifting the front of said vehicle, and means for securing said arms to said axle for holding said arms in operative position.

14. In a parking device for a vehicle, an arm, a traction wheel carried thereby, means for swinging said arm for lifting the front of said vehicle, and a brake for preventing rotation of said wheel until it is swung into operative position.

JOHN MYERS.